C. E. KELLS, Jr.
AUTOMOBILE JACK.
APPLICATION FILED OCT. 23, 1911.

1,037,924.

Patented Sept. 10, 1912.

Witnesses

Inventor.
C. E. Kells Jr.
By Baldwin & Wight
his Attorneys

UNITED STATES PATENT OFFICE.

CHARLES EDMUND KELLS, JR., OF NEW ORLEANS, LOUISIANA.

AUTOMOBILE-JACK.

1,037,924.  Specification of Letters Patent.  Patented Sept. 10, 1912.

Application filed October 23, 1911. Serial No. 656,102.

*To all whom it may concern:*

Be it known that I, CHARLES EDMUND KELLS, Jr., a citizen of the United States, residing in New Orleans, in the parish of Orleans and State of Louisiana, have invented certain new and useful Improvements in Automobile-Jacks, of which the following is a specification.

The object of my invention is to provide a jack for raising automobile wheels from the ground to relieve the tires from pressure and strain and to permit of their being conveniently inspected and repaired or relieved of any injurious matter which may be adhering to them.

In carrying out my invention I employ a jack, frame, lifting bar and operating mechanism, all of which may be of any well known or approved construction and I connect to the upper end of the lifting bar a frame carrying one or more rollers which support a belt adapted to engage the hub of an automobile wheel.

In one form of my invention I employ a bifurcated frame carrying two rollers that are mounted to turn in bearings in the frame, and over these rollers I extend a belt the upper surface of which sags slightly and is adapted to engage the hub of the wheel. By operating the jack the wheel may be lifted and thus the tire relieved of pressure and strain. The wheel may also be turned and inspected and repaired or relieved from injurious matter which may be adhering to it.

In another form of the invention a frame is attached to the upper end of the lifting bar and carries a single roller from which a belt is suspended, the lower portion of which is adapted to engage the wheel hub, the arrangement being such that when the jack is operated the wheel is lifted and may be turned to any desired extent.

Figure 1:
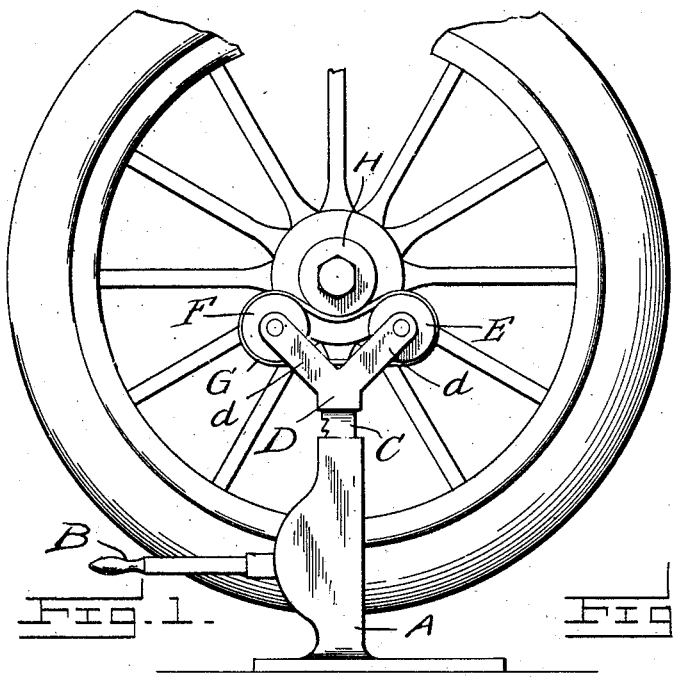
Figure 2:
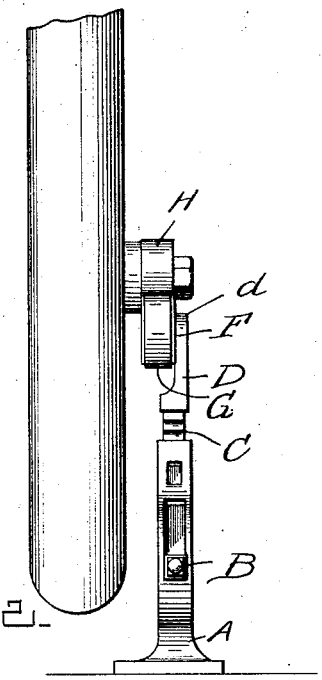
Figure 3:
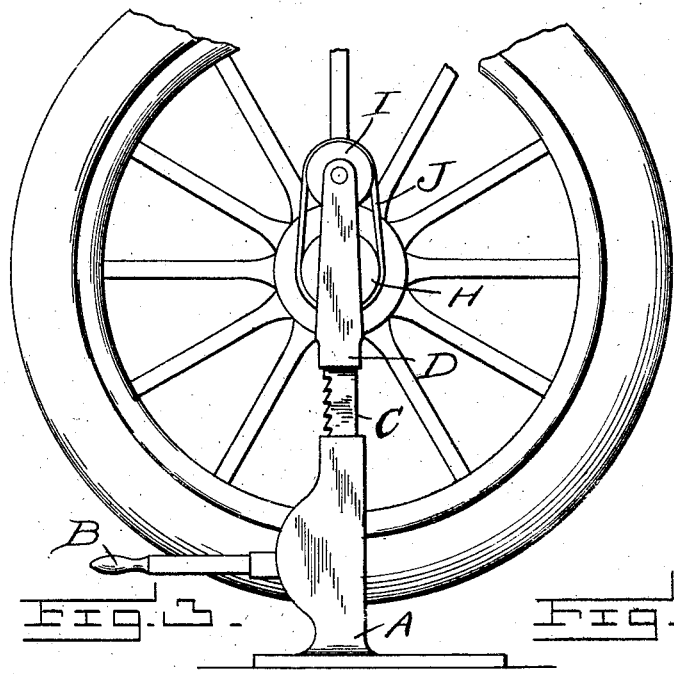
Figure 4:
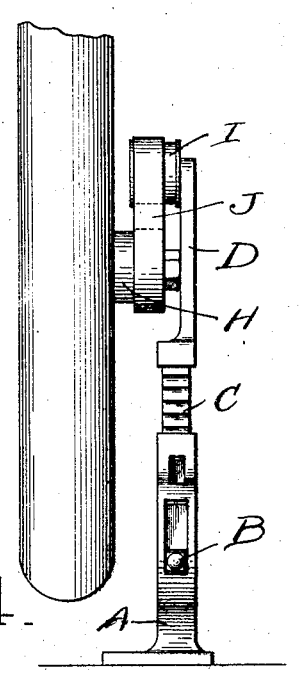

In the accompanying drawings, Figure 1 is a front elevation of a jack constructed in accordance with my invention and shows how it may be employed to lift an automobile wheel. Fig. 2 shows an end elevation of the same. Fig. 3 is a view similar to Fig. 1 but showing a modified construction. Fig. 4 shows an end elevation thereof.

The frame A, lifting bar C, and lever B may be of any desired construction, in fact, the jack proper may be of any desired kind. To the top of the lifting bar shown in Figs. 1 and 2 is attached a bifurcated frame D carrying at the upper ends of the arms $d$, rollers E, F, over which extends an endless belt G which may be made of leather or other suitable material, or it may be an endless chain. This belt is adapted to engage the hub H as shown. Obviously the wheel may be lifted from the ground by operating the lever B and when so lifted may be turned around to any desired extent. The belt conforms to the shape of the part of the hub which it engages and moves over the rollers as the wheel is turned. In this way the hub is relieved of rubbing and friction and is permitted to turn very freely.

In Figs. 3 and 4 instead of employing a bifurcated frame with two rollers I employ a vertical frame to the upper end of which is pivoted a roller I from which is suspended a belt G adapted to engage a hub H as indicated. When the wheel is lifted it may be freely turned the belt moving with the hub.

While the jack is especially intended for use in lifting automobile wheels, it may be used for other purposes.

I claim as my invention:

1. A jack for automobile wheels, comprising a vertically adjustable lifting member, a frame carried by said member, a roller mounted to turn on the frame, and an endless belt adapted to engage the wheel hub which is supported by the roller and is adapted to turn therewith.

2. A jack for automobile wheels, comprising a vertically adjustable lifting member, a frame carried by said member, a pair of rollers mounted on said member and adjustable vertically therewith, and an endless wheel supporting belt adapted to engage the wheel hub which is supported by said rollers and which turns therewith.

In testimony whereof, I have hereunto subscribed my name.

CHARLES EDMUND KELLS, JR.

Witnesses:
SAMUEL H. MCAFEE,
J. OGDEN PIERSON.

---

Copies of this patent may be obtained for five cents each, by addressing the "Commissioner of Patents, Washington, D. C."